(12) United States Patent
Kirscht

(10) Patent No.: US 6,952,178 B2
(45) Date of Patent: Oct. 4, 2005

(54) METHOD OF DETECTING MOVING OBJECTS AND ESTIMATING THEIR VELOCITY AND POSITION IN SAR IMAGES

(75) Inventor: Martin Kirscht, Immenstaad (DE)

(73) Assignee: EADS Deutschland GmbH, Ottobrunn (DE)

(*) Notice: Subject to any disclaimer, the term of this patent is extended or adjusted under 35 U.S.C. 154(b) by 0 days.

(21) Appl. No.: 10/460,647

(22) Filed: Jun. 13, 2003

(65) Prior Publication Data

US 2004/0032361 A1 Feb. 19, 2004

(30) Foreign Application Priority Data

Jun. 14, 2002 (DE) .......................... 102 26 508

(51) Int. Cl.$^7$ .............................. G01S 13/90
(52) U.S. Cl. ............... 342/25 B; 342/25 R; 342/107; 342/162; 342/188
(58) Field of Search ............. 342/25, 90, 95, 342/96, 104, 107, 112, 114, 159–160, 162, 188, 189, 25 R, 25 A–25 B (56) References Cited

U.S. PATENT DOCUMENTS

| | | | | |
|---|---|---|---|---|
| 5,058,024 A | * | 10/1991 | Inselberg | 701/301 |
| 5,138,321 A | * | 8/1992 | Hammer | 342/36 |
| 5,170,440 A | * | 12/1992 | Cox | 382/199 |
| 5,406,289 A | * | 4/1995 | Barker et al. | 342/96 |
| 5,537,119 A | * | 7/1996 | Poore, Jr. | 342/96 |
| 5,910,785 A | * | 6/1999 | Normant | 342/25 |
| 6,404,380 B2 | * | 6/2002 | Poore, Jr. | 342/96 |

FOREIGN PATENT DOCUMENTS

DE 196 18 155 A1 5/1996

OTHER PUBLICATIONS

"Estimation of Velocity, Shape, and Position of Moving Objects with SAR", Martin Kirscht, (Presented at the Fourth International Airborne Remote Sensing Conference and Exhibition/21$^{st}$ Canadian Symposium on Remote Sensing, Ottawa, Ontario, Canada Jun. 21–24, 1999.

(Continued)

Primary Examiner—Thomas H. Tarcza
Assistant Examiner—Isam Alsomiri
(74) Attorney, Agent, or Firm—Crowell & Moring LLP (57) ABSTRACT

A method of detecting moving objects and of estimating their velocity and position in SAR images includes the steps of generating a sequence of single-look SAR images which have the same polarization, are successive in time, and have a look center frequency which varies from one image to the next; detecting candidates for moving objects in the single-look SAR images of the sequence by searching for regions with a course of intensity that deviates from the environment; estimating the velocity of the detected candidates; and verifying the detected candidates as moving objects. The estimation of one or more velocity components of a detected candidate takes place jointly with the estimation of one or more position components of the candidate. A cost function is established as a function of the components to be estimated, taking into account the positions of the candidate in the individual single-look SAR images of the sequence, which cost function is minimized by means of an optimization method for the parameter or parameters to be estimated.

7 Claims, 8 Drawing Sheets

OTHER PUBLICATIONS

Kirscht M: "Detection and Imaging of arbitrarily moving targets with single-channel sar" 2002 Int. Radar Conference, Oct. 15, 2002; pp. 280–285, XP010626878, London.
Kirscht M. ED—Stein T I (ED) Institute of Electrical & Electronics Engineers: "Detection and velocity estimation of moving objects in a sequence of single-look SAR images"; IGARSS 1996, International Geoscience and Remote sensing Symposium: Remote Sensing for a sustainable Future. Lincoln, NE, May 28–31, 1996, International Geoscience And Remote Sensing Symposium. IGARSS, New York, IEEE, US B. vol. 1, May 28, 1996; pp. 333–335, XP000659604 ISBN: 0-7803-3069-2.

Barbarossa s et al: "Detection and Imaging of Moving objects with Synthetic Aperture Radar. Part 2: Joint Time-Frequency Analysis by Wigner–Ville Distribution" IEE Proceedings F. Communications, Radar & Signal Processing, Institution of Electrical Engineers, Stevenage, GB Gb. 139, No. 1, Part F, Feb. 1, 1992, pp. 89–97 XP000257894—ISSN: 0956-375X.

Alparone L.: "A Fuzzy Complete SAR Processing Chain for Ship Detection and Velocity Estimation"; European Transactions on Telecommunications and related technologies, AEI, Milano, IT, Bd. 2, No. 6, Nov. 1, 1991, pp. 689–693, XP000278632—ISSN: 1120-3862.

* cited by examiner

METHOD OF DETECTING MOVING OBJECTS AND ESTIMATING THEIR VELOCITY AND POSITION IN SAR IMAGES

BACKGROUND AND SUMMARY OF THE INVENTION

This application claims the priority of German patent application 102 26 508.9, filed Jun. 14, 2002, the disclosure of which is expressly incorporated by reference herein.

The invention relates to a method for detecting moving objects and for estimating their velocity and position.

STATE OF THE ART

In the extraction of images from Synthetic Aperture Radar (SAR) raw data, as a result of the physical principles that are employed, image defects are encountered when moving objects (such as vehicles; also called moving targets) are in the scenery. As discussed in R. K. Raney, "Synthetic aperture imaging radar and moving targets", IEEE Trans. Aerospace and Electronic Systems, Band Vol. AES-7, No. 3, pp. 499–505, May 1971, three significant effects occur as a function of the direction of movement of the objects:

During a radial movement of a target relative to the SAR system, an additional Doppler shift occurs. This results in a shifting of the object in the positive or negative azimuth direction; that is, in the flight direction or against the flight direction of the radar antenna. Such movement is accompanied by a velocity component in the range direction (also cross-track direction), which is called simply "range velocity".

At a high range velocity, the object disappears in the SAR image.

When the object moves in the azimuth direction (flight direction), the Doppler rate will change, so that the object in the SAR image is distorted in the azimuth direction.

In this case, an azimuth (along-track component) of the object velocity therefore exists which will be referred to as "azimuth velocity".

Additional effects occur during the acceleration of the moving object which, however, will not be discussed here in detail.

In order to eliminate the described image defects, it is necessary to detect the moving objects and to estimate their velocity and position. The estimation of the shape of the objects is also advantageous.

To detect static objects in SAR images, a conventional method utilizes the covariance matrix between the picture elements of differently polarized images. (See Y. Wang, R. Chellappa and Q. Zheng, "CFAR detection of targets in full polarimetric SAR images", Technical Report, Department of Computer Science, University of Maryland, College Park, Nov. 1993.) However, images with different polarizations are not always available.

Most known methods of estimating the movements of targets (MTI—Moving Target Indication) utilize range-compressed SAR data, which are either transformed into the Doppler frequency domain (as discussed for example, in A. Freeman and A. Currie, "Synthetic aperture radar (SAR) images of moving targets", GEC Journal of Research, Vol. 5, No. 2, 1987 and E. D'Addio, M. Di Bisceglie and S. Bottalico, "Detection of moving objects with airborne SAR", Signal Processing, Vol. 36, No. 2, pp. 149–162, March 1994.) or into a time-frequency plane. (See S. Barbarossa and A. Farina: "Detection and imaging of moving objects with synthetic aperture radar, Part 2: Joint time-frequency analysis by Wigner-Ville distribution", in IEE Proceedings-F, Vol. 139, No. 1, pp. 89–97, February 1992.) These methods are not capable of detecting objects that move exclusively in the azimuth direction, because such objects are filtered out together with the background data (clutter data). In addition, in this method, a pulse repetition frequency (PRF) is required which is much larger than the Doppler bandwidth of the stationary background (clutter bandwidth) and therefore has limitations with respect to the usable SAR system. Finally, high estimation inaccuracies occur in some case when these methods are used.

German Patent Document DE 44 23 899 C1 discloses a method for detecting, localizing and estimating the velocity of moving targets from SAR raw data which operates in the frequency range. (See also, J. R. Moreira and W. Keydel, "A new MTI-SAR approach using the reflectivity displacement method", IEEE Trans. Geoscience and Remote Sensing, Vol. 33, No. 5, pp. 1238–1244, September 1995. This technique exploits the correlation between two azimuth spectra which are formed immediately after one another, relative to time. This method is capable of estimating the azimuth velocity of moving objects, but has disadvantages with respect to the imaging of the moving sequences of the moving objects. In particular, it is not possible to assign directly the obtained velocity values to the moving objects in the SAR image. In addition, only objects are detected whose azimuth velocity is greater than 22 km/h. The range velocity is estimated only very roughly.

A method disclosed in M. Kirscht, "Detection, velocity estimation and imaging of moving targets with single-channel SAR", in Proc. of European Conference on Synthetic Aperture Radar, EUSAR'98, Friedrichshafen, Germany, pp. 587–590, May 1998, and also suggested in German Patent Document DE 196 18 155 C2, utilizes the time correlation in a sequence of single-look SAR images (SL-images) to detect and estimate the velocity of moving objects. This sequence is first generated from range-compressed data by using the entire available Doppler spectrum. After generating the sequence, candidates for moving objects are detected in the single-look SAR images by searching for regions with a course of intensity that deviates with respect to the environment. The velocity of the detected candidate is subsequently estimated by estimating the displacement vector of a candidate while utilizing the correlation between successive single-look SAR images.

The method disclosed in German Patent Document DE 196 18 155 C2, however, cannot detect objects which move exclusively in the range direction, and the measuring range of the range velocity is limited by the PRF defined by the system. Furthermore, no provision is made to estimate the position of the moving objects.

It is therefore an object of the present invention to provide a detection method that can be carried out independently of the movement direction of objects.

Another object of the invention is to expand the velocity measuring range.

Still another object of the invention is to provide a method for position estimation.

These and other objects and advantages are achieved by the method according to the invention, in which one or more velocity components of a detected candidate are estimated jointly with the estimation of one or more position components of the candidate. Considering the positions of the candidate in the individual single-look SAR images of the sequence, a cost function is established which is dependent on the parameters to be estimated. The cost function is minimized by means of an optimizing method.

Only data of a conventional SAR system (that is, a system with one polarization, one carrier frequency and a single channel) are used in the method according to the invention. By means of the method according to the invention, objects moving arbitrarily on the surface of the earth can be detected and their azimuth and range velocities, as well as their position, can be estimated with good precision. This method operates by means of a PRF which is only insignificantly larger than the clutter bandwidth.

By means of the method according to the invention, image defects (that is, all three above-mentioned effects) can be compensated, so that a distortion-free imaging of the moving objects can be achieved. The results of the method according to the invention can be visualized by displaying the SL images as a moving image sequence, showing a static background and marked moving objects.

Other objects, advantages and novel features of the present invention will become apparent from the following detailed description of the invention when considered in conjunction with the accompanying drawings.

DETAILED DESCRIPTION OF THE DRAWINGS

Generating an SAR Image Sequence

Figure 1A:
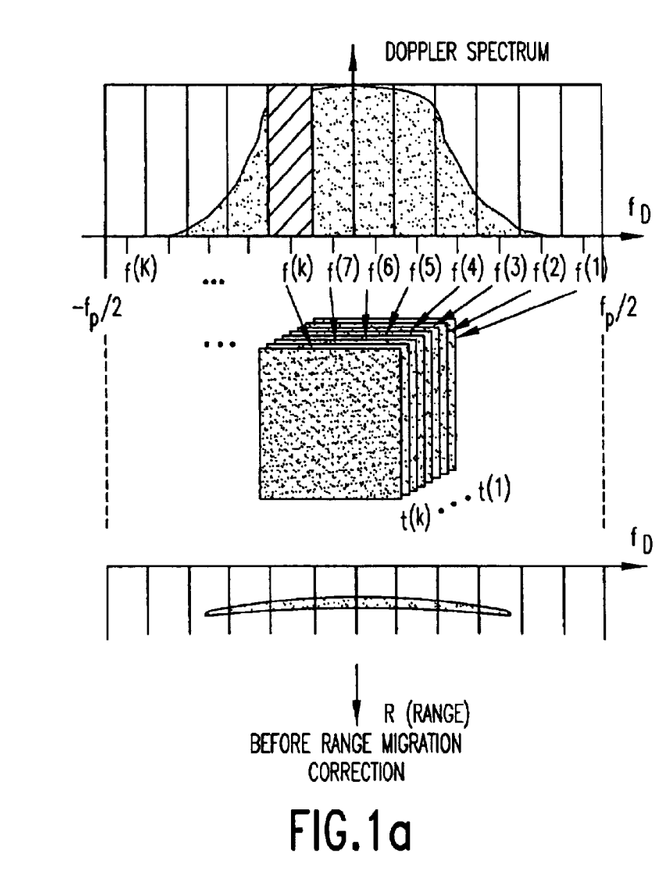
FIGS. 1a) and b) depict graphically the generating of a sequence of single-look SAR images with a representation of the range migration hyperbola of a static object in the range Doppler domain (bottom) before and after the range migration correction.
Figure 1B:
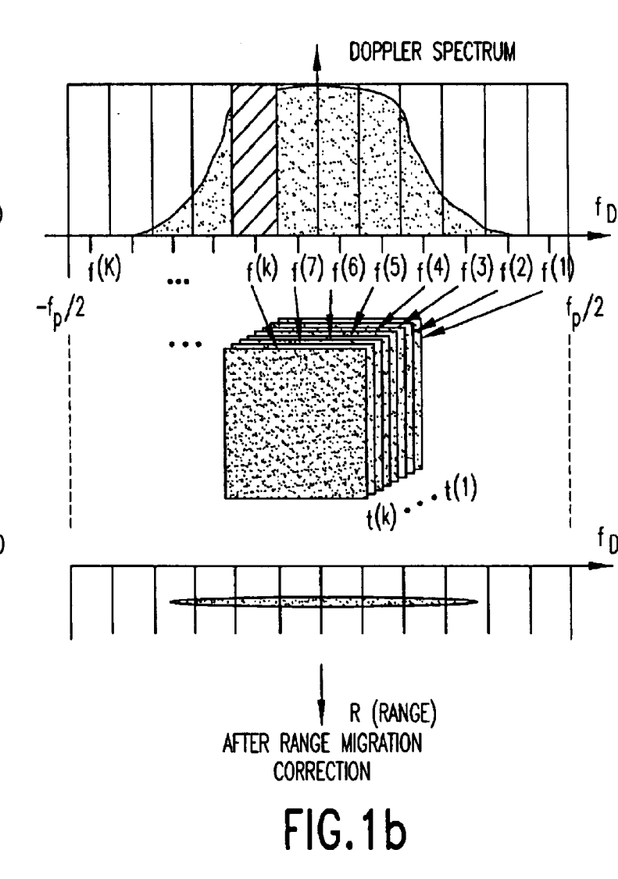

The SAR image sequence is generated from SAR data of a conventional (that is, single-channel) SAR system and consists of time sequential single-look SAR images (SL images). An SL image is an image which is processed, using a subband from the Doppler spectrum (that is, a look of a defined look bandwidth), without averaging and therefore with a maximum azimuth resolution relative to the look bandwidth. To generate the sequence of SL images, the range-compressed SAR data are first transferred by means of a Fourier transformation in the azimuth direction into the Doppler frequency domain. The complete Doppler spectrum obtained in this manner is divided into overlapping bands, each having the same look bandwidth, and one SL image is generated per band (See FIG. 1a)). In FIGS. 1a) and b), the Doppler frequency is marked $f_D$ and the scanning frequency (PRF) is marked $f_p$. The images will then show the earth's surface from different (horizontal) viewing angles $\theta^{(k)}$, which, in turn, depend on the band center frequencies, or look center frequencies, $f^{(k)}$ as follows:

$$\theta^{(k)} = -\arcsin\frac{f^{(k)}\lambda}{2v_{Ax}} \qquad (1)$$

wherein k indicates the number of the SL image, $v_{Ax}$ indicates the antenna velocity which is directed precisely in the azimuth direction x, and $\lambda$ indicates the carrier wavelength. The different viewing angles of the individual images simultaneously provide views at different points in time, and therefore permit the arrangement of the images in a time sequence. The points in time $t^{(k)}$, valid for static objects (index T-target) with an azimuth position in the center of the scenery (z=0) follow from $$t^{(k)}(R_{T,0}) = \frac{R_{T,0}\tan\theta^{(k)}}{v_{Ax}} \approx -\frac{R_{T,0}f^{(k)}\lambda}{2v_{Ax}^2} \text{ with } f^{(k)} = -\frac{2v_{Ax}\sin\theta^{(k)}}{\lambda} \qquad (2)$$

wherein $R_{T,0}$ is the shortest distance between the antenna and the static object. The look bandwidth is tuned to the velocity range to be measured, and is sufficiently large that the fastest objects in the image are still approximately recognizable as being dot-shaped. In addition, it should be at least large enough that the necessary resolution is still achieved.

The images of the sequence are subjected to a ground range correction and to a range migration correction. The latter is carried out by a displacement of the images in the range direction y corresponding to the distance between the antenna and the objects on the earth's surface (FIGS. 1a), b)), which is a function of the respective viewing angle. The advantages of this method in comparison to the conventional method (described, for example in J. C. Curlander and R. N. McDonough: Synthetic Aperture Radar: Systems and Signal Processing, New York: John Wiley & Sons, 1991, pp. 193f.) consist of a gain of run time and easier handling when estimating the range velocity. As a result, the static background in the individual images of the sequence appears in the same position, and only the positions of the moving objects change from one SL image to the next.

Detection of Candidates for Moving Objects

After generation of the sequence, candidates for moving objects are selected in each SL image of the sequence. As a criterion for detection as a candidate, an approximately dot-shaped or ellipse-shaped pattern is used (the pattern that would occur in the case of an existing azimuth velocity). The search for candidates is started at picture elements (pixels) of maximum intensity; that is, at points with maximum backscatter coefficients (RCS—radar cross-section). The starting pixel and the surrounding pixels will be selected as a candidate if the following criteria have been met:

The brightest pixel of the candidate has a higher intensity than a threshold depending on the global intensity of the image;

the number of pixels pertaining to a candidate is between minimum and maximum values; in this case, the maximum value depends on the length of the object shape visible in the image in the azimuth direction and can therefore be selected corresponding to the maximal velocity to be detected;

the mean intensity of the pixels of a candidate is noticeably higher than the mean intensity of its surrounding neighborhood;

the pixels of a candidate form a closed area;

no pixel of a just viewed candidate touches a pixel of a previously detected candidate.

After a successful examination of these criteria, the candidate is successfully detected in the corresponding SL image. In an advantageous embodiment of the invention, the pixels of the candidate which meet the above-mentioned condition form a so-called initial shape $S_{M,0}^{(k)}$ (Index M for moving targets) of the candidate in the SL image k.

After the examination of these criteria for a starting pixel, the same steps are repeated for the other starting pixels of the same intensity, and are subsequently repeated for those with a lower intensity until the intensity threshold value has been reached.

After analyzing the first SL image k=1, the other SL images are also analyzed, so that candidates and pertaining initial shapes are obtained for each SL image. In the next step, the candidates obtained in the individual SL images are assigned to one another; that is, it is attempted to track a candidate after the first detection in the image $k_0$ by means of the displacement vectors estimated in the next section by way of the SL images. If the tracking is successful, the individual shapes $S_{M,0}^{(k)}$ from the various SL images k are assigned to the respective candidate.

Velocity and Position Estimation

For each candidate, velocity and position are estimated in several steps:

Measurement of the displacement vectors between each two successive SL images of the sequence;

independent estimation of the azimuth velocity by means of an observation model for the azimuth positions and a maximum likelihood estimator;

independent estimation of the range velocity by means of an observation model for the range positions and a maximum likelihood estimator; and joint estimation of velocity and position by an expanded observation model for positions using the first estimated values as starting values. In an advantageous embodiment of the invention, an additional parameter for the compensation of the aliasing in the Doppler spectrum is taken into account.

In an advantageous embodiment of the invention, in the observation model for the joint estimation of the velocity and the position, in addition to the positions of the candidates in the individual SL images, the amplitudes of the candidates in the respective SL images are also taken into account.

Measuring of the Displacement Vectors

Figure 2:
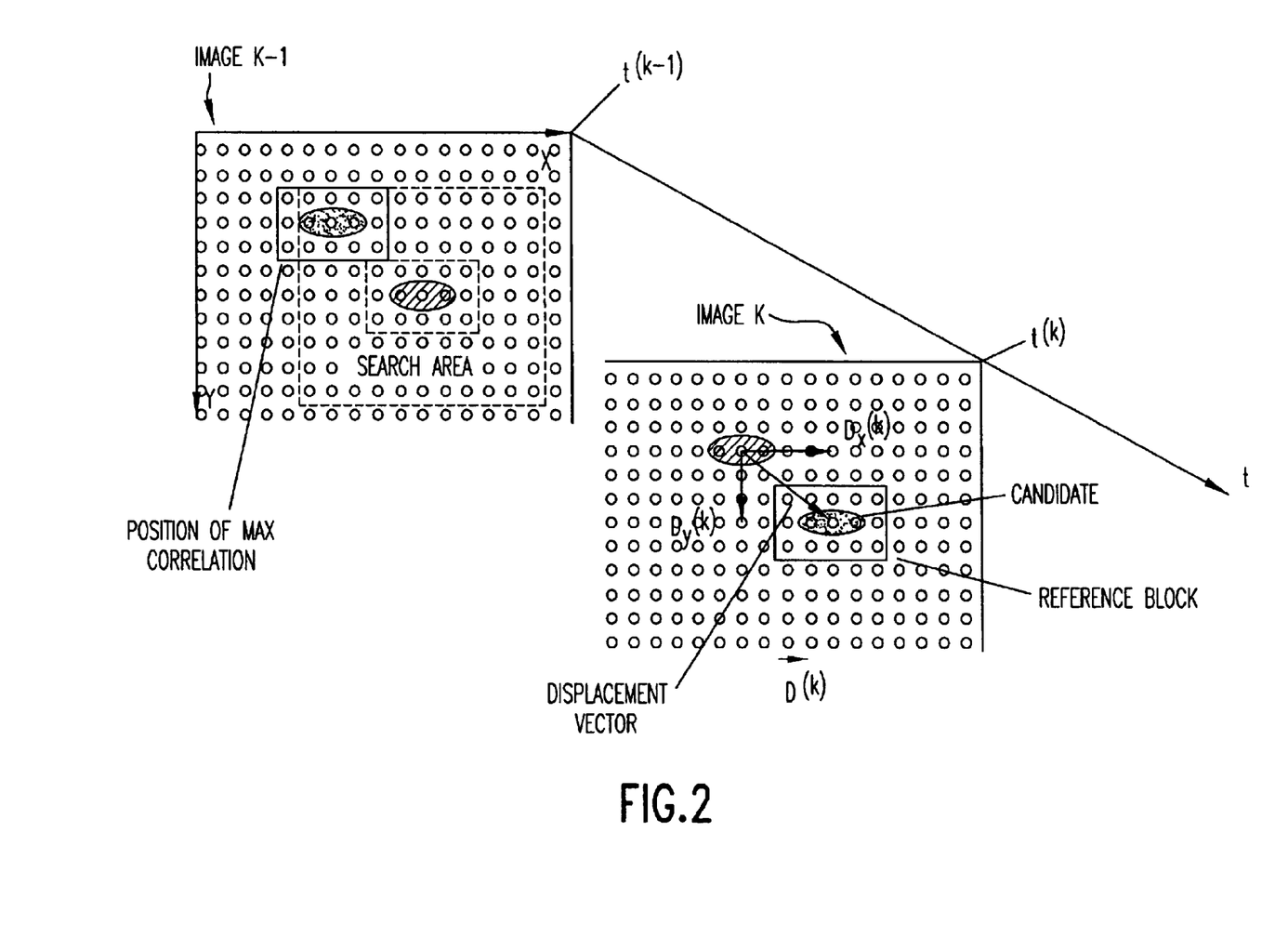
FIG. 2 illustrates a measurement of a displacement vector from a pair of images of the sequence (block matching)

Displacement vectors are measured for a candidate between two successive images $s_k$ and $s_{k+1}$ from the sequence. For this purpose a blockmatching algorithm can be used, such as is known, for example, from videotelephony (See M. Bierling, "Displacement estimation by hierarchical blockmatching", $3^{rd}$ SPIE Symposium on Visual Communications and Image Processing, Cambridge, USA, pp. 942–951, 1988.) In this algorithm, a window is placed in the location of the candidate in image $s_{k+1}$, so that the candidate is in the center (see FIG. 2). Now, in image $s_k$, starting from the same position, a second window is displaced within a defined search area until that position has been reached in which the respective amplitude values of the pixels in the two windows have the greatest correlation. It is assumed that the position difference between the two windows corresponds to the displacement vector of the candidate between the two images. This displacement vector is assigned to image $s_{k+1}$, so that no displacement vector exists for the first image of the sequence.

For determining the correlation, various matching criteria may be used, such as the cross correlation coefficient, the normalized cross correlation function (NCCF), the mean square error (MSE) or the mean absolute difference (MAD). The NCCF criterion provides the best results but, with a view to a shorter run time, the MSE criterion may also be used which supplies results which are almost as good. The NCCF criterion is defined as follows:

$$C_{Ns_{k+1}s_k}(D_x, D_y) = \frac{\sum_{x,y}[s_{k+1}(x, y) \cdot s_k(x - D_x, y - D_y)]}{\sqrt{\sum_{x,y} s_{k+1}^2(x, y) \cdot \sum_{x,y} s_k^2(x - D_x, y - D_y)}} \qquad (3)$$

wherein (x, y) is one of the positions within the window in image $s_{k+1}$; and $D_x$, and $D_y$ indicate the position differences between the two windows. The displacement vector from the first pair of images $k_0$, $k_0+1$ is used to track the candidate in image $k_0+2$ because it is expected that the movement direction of the candidate will change only insignificantly from one image to the next. Thus, it becomes possible to track the candidate also by way of the additional images of the sequence to image $k_0+K_M-1$; that is, the last image in which the candidate was detected on the basis of its amplitude values. $K_M$ is therefore the total number of images in which the candidate was detected.

Estimation of the Azimuth Velocity

From the displacement vector in the [pixel/image] unit $\vec{D}^{(k)}=(D_x,D_y)^k$, the observed velocity in [m/s] can be computed, taking into account the pixel spacing $\delta x$ (assumed to be the same in the azimuth and the range direction) and the time difference $\Delta t$ between two successive images:

$$\vec{v}_{M,n} = \frac{\overline{D}^{(k)} \delta x}{\Delta t} \qquad (4)$$

The time difference $\Delta t$ is obtained using (2) and the minimal distance $R_{M,0}$ between the antenna and the considered moving candidate as follows:

$$\Delta t \approx \frac{\Delta \theta R_{M,0}}{v_{Ax}} \approx \frac{\Delta f_k \lambda R_{M,0}}{2 v_{Ax}^2} \text{ for } \sin\theta \approx \theta \approx \tan\theta \quad (5)$$

wherein $\Delta\theta$ is the angular difference and $\Delta f_k$ is the difference of the look center frequencies between two successive images. Therefore, the time t is not the same everywhere in the image, but is a function of the range distance.

The observed velocity $\vec{v}_{M,m}$ does not correspond to the real velocity for various reasons:

In the azimuth direction, due to compression or stretching of the spectrum, combined with the deviation of observation times for the moving objects in the SL images from those of the static objects;

in the range direction, as a result of the range migration correction.

Furthermore, there is a time-related shifting of those moving objects which move in the range direction. This time-related shifting is a result of the additional Doppler shift $$f_M = -\frac{2v_{My}\sin\eta}{\lambda} \quad (6)$$

wherein $\eta$ is the viewing angle (corresponds to 90°—angle of incidence), and the following is obtained (compare (2)):

$$\Delta t_M = -\frac{f_M \lambda R_{M,0}}{2 v_{Ax}^2} = \frac{v_{My}\sin\eta \cdot R_{M,0}}{v_{Ax}^2} \quad (7)$$

This time-related shifting results in an imaging of such objects in other SL images than those which were expected.

In the following, the two velocity components to be observed (and thus the deviation of the observed quantities) from the true quantities are first analyzed separately.

In the azimuth direction, the velocity errors can be explained in that the azimuth positions of the moving objects do not correspond to the actual positions. For example, Ouchi showed that the moving objects in the SL images appear in azimuth positions as if they had a velocity which is twice has high as in reality. (K. Ouchi, "On the multilook images of moving targets by synthetic aperture radars", IEEE Trans. Antennas and Propagation, Vol. AP-33, No. 8, pp. 823–827.) However, among other things, Ouchi used the approximation $v_{Mx}/v_{Ax}<<1$ in this case, which is not met in the case of slow carrier platforms and fast objects. A more precise factor $m_{v_{M,m}}$ is therefore derived as the quotient from the analytically derived velocity component $v_{Mx,a}$ to be observed and the real velocity component $v_{Mx}$ which does not require this approximation and is based on the azimuth positions $p_{Mx}$ of the moving object which are to be observed:

$$m_{Mx} = \frac{v_{Mx,a}}{v_{Mx}} = \frac{p_{Mx}}{v_{Mx}t} \quad (8)$$

Since the behavior of moving objects is almost independent of the azimuth position, without limiting the generality, the azimuth position may be set at the point in time t=0 at $p_{Mx,0}=p_{Mx}(t=0)=0$. In (5), $\Delta t=t$ and $\Delta f_k=f_D$, thus the resulting Doppler shift, can then be introduced. If the azimuth position of the antenna is called $p_{Ax}$, using (1) and (2), the following will then be true:

$$m_{v_{Mx}} \approx -\frac{1}{v_{Mx}} \cdot \frac{p_{Ax} + R_{M,0}\tan\left(\arcsin\frac{f_D\lambda}{2v_{Ax}}\right)}{\frac{f_D\lambda R_{M,0}}{2v_{Ax}^2}} \quad (9)$$

If the approximation $\sin\theta \approx \theta \approx \tan\theta$ is carried out again, this can be converted by means of $$f_D = -\frac{2(v_{Ax} - v_{Mx})}{\lambda} \cdot \sin\theta \quad (10)$$

and $p_{Ax}=v_{Ax}t$ to $$m_{v_{Mx}} = \frac{v_{Mx,a}}{v_{Mx}} \approx -\frac{v_{Ax}}{v_{Mx}} \cdot \left(1 - \frac{v_{Ax}^2}{(v_{Ax} - v_{Mx})^2}\right) \quad (11)$$

For the underlying real velocity, this results in $$v_{Mx} = f^{-1}(v_{Mx,a}) = v_{Ax} - \sqrt{\frac{v_{Ax}^3}{v_{Mx,a} + v_{Ax}}} \text{ for } v_{Mx,a} > -v_{Ax} \quad (12)$$

Figures 3, 4:
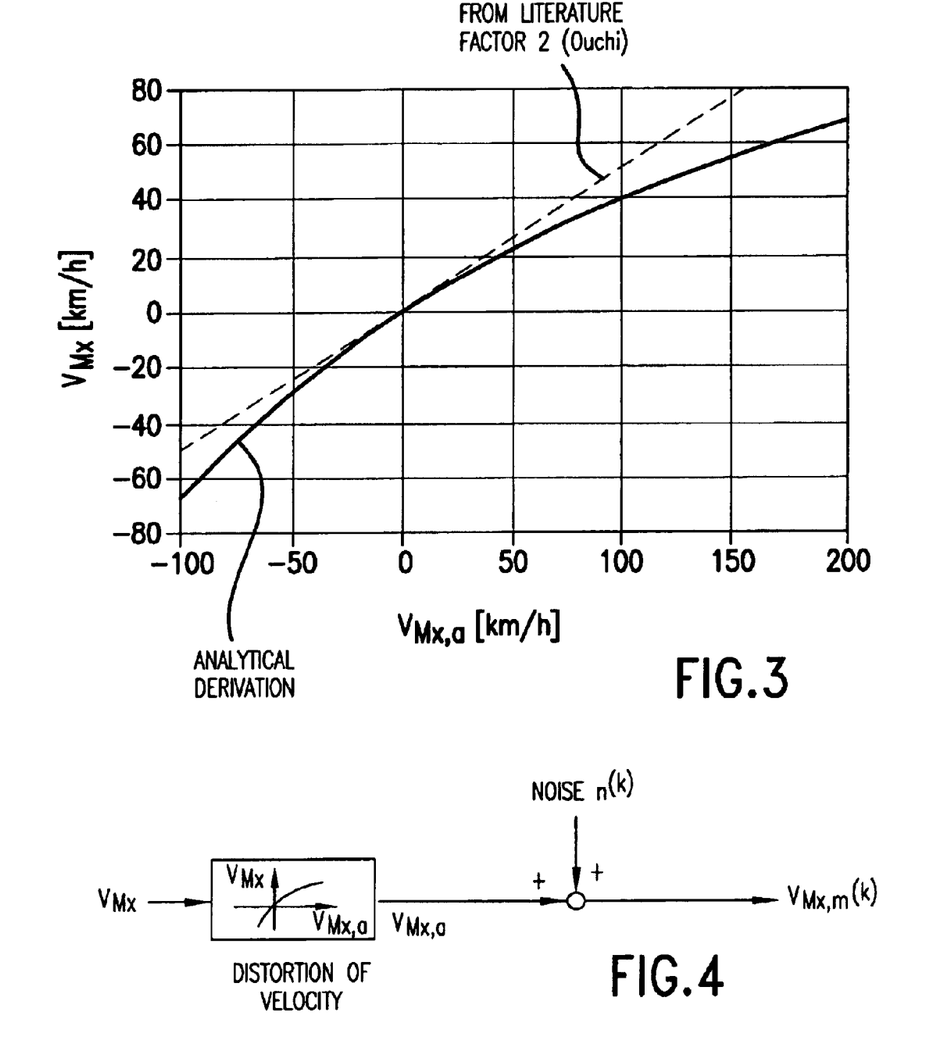
FIG. 3 is a graphic presentation of the relationship between azimuth velocity $V_{Mx,a}$ to be observed in the SL images and the actual velocity $v_{mx}$ in the azimuth direction, without considering disturbances (e.g., noise)
FIG. 4 is a schematic depiction of an observation model for independently estimating the azimuth velocity, the components $v_{Mx,m}^{(k)}$ present at the output being measured which are disturbed by noise.

This relation is graphically illustrated in FIG. 3 for $v_{Ax}=82.5$ m/s=297 km/h. It is demonstrated that, for low velocities $v_{Mx}$, this relation corresponds to the factor 2 found by Ouchi. If it is assumed that the displacement vectors reflect the actual displacements of the candidate from image k−1 to image k, that is, are undisturbed, the inverse of Equation (12) provides a relation between the true velocity $v_{Mx}$ and the velocity measured by means of the displacement vectors. By means of Equation (4), a first estimated value is therefore obtained from (12) for the velocity $v_{Mx}$ in image k as a function of the displacement vector component $D_x^{(k)}$ as follows:

$$\hat{v}_{Mx,1}^{(k)} = v_{Ax} \cdot \left[1 - \frac{1}{\sqrt{1 - \frac{2D_x^{(k)}\delta x v_{Ax}}{\Delta f_k \lambda R_{M,0}}}}\right] \text{ for } v_{Mx,a} > -v_{Ax} \quad (13)$$

However, normally the observed quantities (that is, in this case, the displacement vectors) are not undisturbed. In an observation model, it may be assumed that all disturbances are represented collectively by an additive, normally distributed noise $n^{(k)}$. (See FIG. 4.) Based on this observation model, the so-called maximum-likelihood estimation method is therefore suitable for achieving an optimal estimate. This estimation method requires no a-priori knowledge concerning the probability density function of the quantity to be estimated. (See J. L. Melsa and D. L. Cohn, Decision and Estimation Theory, New York: McGraw-Hill, 1978.) By means of the maximum-likelihood (ML) estimation rule, that value $v_{Mx}$ is obtained as the estimate $\hat{v}_{Mx,ML}$ from which the measured values $v_{Mx,m}^{(k)}$ have most probably derived:

$$\hat{v}_{Mx,ML} = \arg\frac{\max}{v_{Mx}}\left(p_{v_{Mx,m}|v_{Mx}}\left(v_{Mx,m}^{(k_0)}, \ldots, v_{Mx,m}^{(k_0+k_M-1)} \mid v_{Mx}\right)\right) \quad (14)$$

Assuming a statistical independence of the disturbances in adjacent images, the conditional composite probability density function in Equation (14) is obtained as a product of normal distributions. After the introduction of this composite probability density function, equation (14) must be derived and set to zero in order to determine the estimate. The maximum likelihood estimate can more easily be determined by the derivation of the negative logarithm of the composite probability density function, the so-called ML Cost Function. By means of the relation according to Equation (12), an estimated value is obtained therefrom for the azimuth velocity at $$\hat{v}_{Mx,ML} = f^{-1}\left[\frac{1}{K_M}\sum_{k=k_0}^{k_0+K_M-1} v_{Mx,m}^{(k)}\right]. \quad (15)$$

After the insertion of Equations (4) and (2), the maximum likelihood estimate (ML) is finally obtained as a function of the displacement vector components $D_x^{(k)}$ at $$\hat{v}_{Mx,ML} = f^{-1}\left[\frac{1}{K_M}\sum_{k=k_0}^{k_0+K_M-1} \frac{2D_x^{(k)}\delta x v_{Ax}^2}{\Delta f_k \lambda R_{M,0}}\right]. \quad (16)$$

Estimation of the Range Velocity

Figure 5:
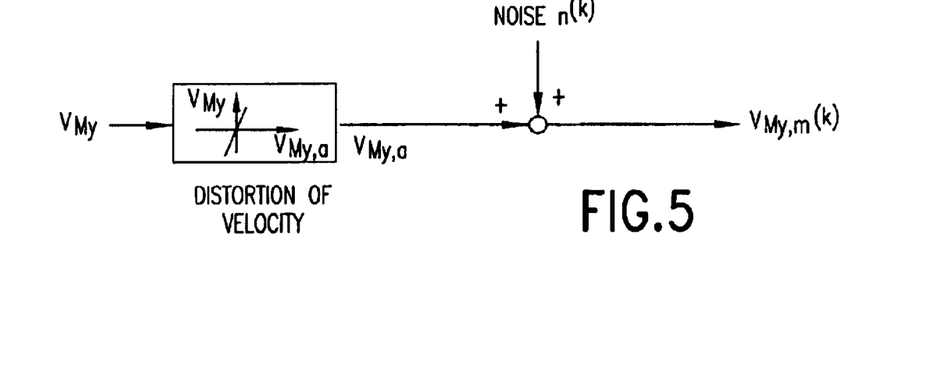
FIG. 5 is a schematic depiction of an observation model for independently estimating the range velocity.

As mentioned above, the velocity component in the range direction $v_{My,m}$ obtained from the displacement vectors is also distorted, but in a different manner than the azimuth component. In the case of the range velocity, the error is the result of the fact that the range positions of those objects whose range velocity is non-zero are displaced by the range migration correction. Nevertheless, by means of the displacement vectors, a first estimated value for the range velocity can be obtained. In this case, the range components of the displacement vectors must be corrected by the position differences $\Delta y_T^{(k)}$ between each two successive SL images caused by the range migration correction. A maximum likelihood estimate of the range velocity is thereby obtained analog to the azimuth velocity by means of the observation model according to FIG. 5, as follows:

$$\hat{v}_{My,ML} = \frac{2v_{Ax}^2 \cdot \delta y}{\Delta f_k \lambda R_{M,0} K_M}\left[\left(-\sum_{k=k_0}^{k_0+K_M-1} D_y^{(k)}\right) + \Delta y_T^{(k_0-1)}(R_{M,0}) - \Delta y_T^{(k_0+K_M-1)}(R_{M,0})\right], \quad (17)$$

wherein the pixel spacing in the range direction is called $\delta y$. The terms from the range migration correction contained therein are obtained as follows:

$$\Delta y_T^{(k)}(R_{M,0}) = \left(\sqrt{(t^{(k)}(R_{M,0}) \cdot v_{Ax})^2 + R_{M,0}^2} - R_{M,0}\right) \cdot \frac{\sin\eta}{\delta y} \quad (18)$$

wherein $t^{(k)}(R)$ is the time from Equation (2) and $\eta$ is the viewing angle (corresponds to 90°—angle of incidence).

The estimated value according to Equation (17) is relatively inaccurate because the position displacements from the range migration correction are almost as large as those from the object movement itself. A more accurate estimate of this component is therefore carried out jointly with the azimuth component and the position in a second step. In an advantageous embodiment of the invention, the accuracy can be increased further by including the amplitude values in the individual SL images.

Joint Velocity and Position Estimation

The joint velocity and position estimate is a significant innovation relative to German Patent Document DE 196 18 155 C2. It permits a detection which is almost independent of the direction of motion of the objects and enlargement of the measuring ranges for the two velocity components. Furthermore, a highly accurate position estimate is obtained—for single-channel SAR systems—which is not yet possible according to German Patent Document 196 18 155 C2.

As described in the first section, the essential effect of object velocity in the range direction is a shift in the azimuth direction. An ambiguity therefore occurs for a moving object, whose image is shifted due to the range velocity, relative to a static object in an azimuth position, deviating by such shift. A method will therefore be explained as to how this ambiguity can be eliminated by evaluating the positions in the individual images of the sequence or how the estimate of the velocity and position can be improved when analyzing this information. Advantageously, in addition to the analysis of the positions, the time-dependent signal amplitude can also be taken into account.

According to the invention, the range velocity and the azimuth position are estimated jointly for this purpose. In addition to the dependence of the measured azimuth position on the range velocity, there is also a slight dependence of the measured displacement vectors $D^{(k)}$ on the position, so that, in this section, for example, four parameters $\hat{p}_{Mx,0}$, $\hat{p}_{My,0}$, $\hat{v}_{Mx}$ and $\hat{v}_{My}$, as well as an additionally introduced parameter a for the aliasing compensation are to be estimated jointly by means of a joint observation model and an optimization process. Input values for the optimization process are the maximum-likelihood estimated values (from the preceding section) for the velocity (Equations (16) and (17)) as well as the averaged individual positions $\bar{p}_M^{(k)}$ from the SL images as starting values for the position. In this case, the azimuth component of the starting position is corrected by the shift caused by the range velocity $$\Delta x_M = -\frac{v_{My}\sin\eta}{v_{Ax}} \cdot R_{M,0} \quad (19)$$

wherein, for $v_{My}$ at this point, the estimated value $\hat{v}_{My,ML}$ from Equation (17) is used.

Figure 6A:
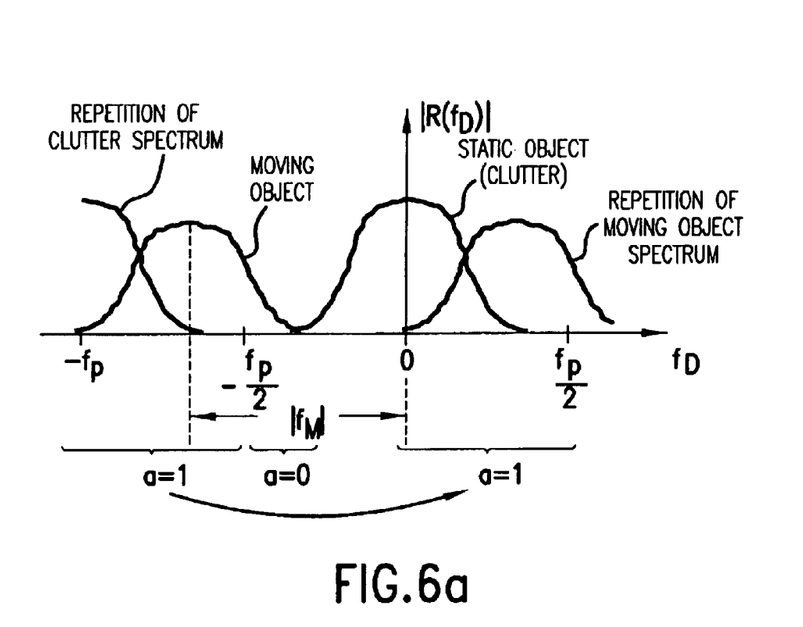
FIGS. 6a) and b) show the Doppler spectra for one static and one moving object, where the movement of object in the range direction and the resulting Doppler shift $f_M$ are so large that aliasing occurs in the Doppler spectrum (the scanning frequency is the PRF $f_p$); a) case a=1 or 0 (positive range velocity); b) case a=−1 or 0 (negative range velocity)
Figure 6B:
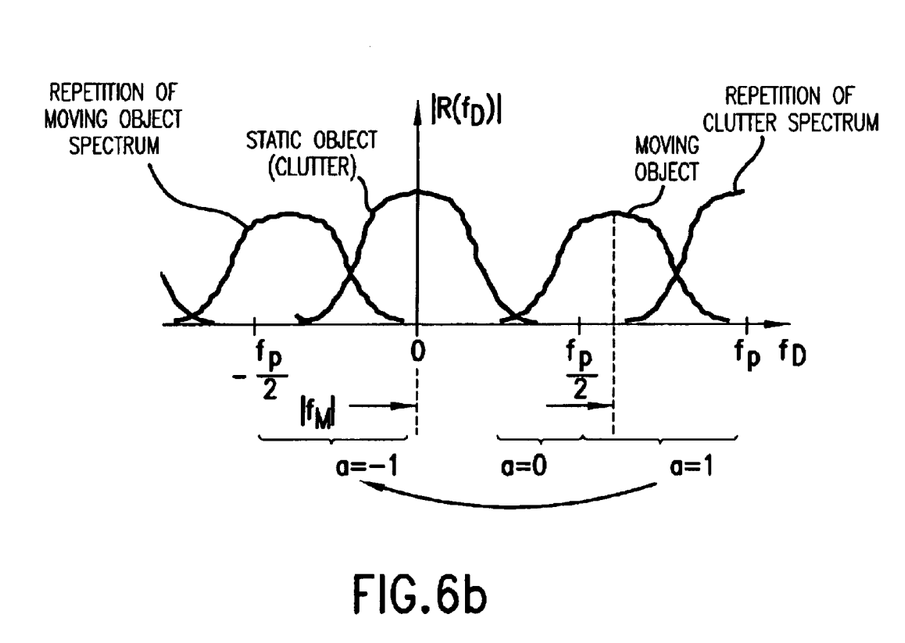

In order to estimate the joint velocity and position, analytical relations for the azimuth and range component of the time-dependent, errored position of an arbitrarily moving object are derived. Advantageously, this analytical relation is expanded by the time-dependent amplitude of the object. The range velocity and the attenuation of the signal due to the antenna diagram are entered into this third relation. In addition, the effect of aliasing in the Doppler spectrum is taken into account in the analytical relations. Such aliasing is caused by a high range velocity which displaces the spectral fractions of a moving object, in a manner corresponding to the Doppler shift according to Equation (5) beyond half the sampling frequency $f_p$ (see FIG. 6). As a result such objects are imaged in other images of the sequence (for example, at the end of the sequence instead of at the beginning), and the change of the amplitude is also shifted with respect to time. By means of the derived analytical relations for the time-dependent positions, a cost function is established, into which quadratic errors are introduced between the measured and the analytically derived positions. Advantageously, the cost function is expanded by the derived analytical relation for the time-dependent amplitude by introducing an additional cost term taking into account, the quadratic errors between the measured and analytically computed amplitudes. Naturally, errors of a higher order and/or absolute errors may also be taken into account in the cost function. It is the goal of the subsequent optimization process to minimize the costs by varying the five parameters because, in a cost function, low costs correspond to a high probability of the parameter combination.

The time-dependent errored azimuth position of an object moving in the range and azimuth direction in the reference position $p_{Mx,0} = p_{Mx}(t=0)=0$ is analytically obtained by means of Equation (1) as follows:

$$X'^{(k)}_{M,a} = v_{Ax} t^{(k)}_M + R'_M(t^{(k)}_M) \frac{f_k \lambda}{2 v_{Ax}} \quad (20)$$

wherein $f_k$ must correspond to the Doppler frequency of the moving object. $R'_M$ is the time-variable range distance falsified by the azimuth displacement. In each case, $t_M^{(k)}$ is the point in time at which the moving object is imaged in the SL image k. Because of the range velocity $v_{My}$, Doppler frequencies may occur which are in the baseband of the Doppler spectrum (a=0) or, when aliasing occurs, are outside (a=−1 or a=1) (See FIG. 6). Since the parameter a may adopt two different values for the same object over the course of the sequence of SL images, it is provided with the superscript index (k). However, in the successive images of the sequence in which a candidate was detected, the parameter $a^{(k)}$ remains constant. As a result, Equation (20) becomes $$X'^{(k)}_{M,a} = v_{Ax} t^{(k)}_M + R'_M(t^{(k)}_M) \frac{(f_D + a^{(k)} \cdot f_p) \cdot \lambda}{2 v_{Ax}} \quad (21)$$

After the insertion of the relation $$f_D(t) = -\frac{2(v_{Ax} - v_{Mx})}{\lambda} \cdot \sin\theta - \frac{2 v_{My}}{\lambda} \cdot \sin\eta \cos\theta \quad (22)$$

and by means of Equation (11), the following is finally obtained $$X'^{(k)}_{M,a} \approx \left( v_{Ax} - \frac{(v_{Ax} - v_{Mx})^2}{v_{Ax}} \right) t^{(k)}_M + \quad (23)$$

$$\frac{(v_{Ax} - v_{Mx})}{v_{Ax}} \cdot p_{Mx,0} + R'_M(t^{(k)}_M) \left( \frac{a^{(k)} \cdot f_p \cdot \lambda}{2 v_{Ax}} - \frac{v_{My}}{v_{Ax}} \cdot \sin\eta \cos\theta_k \right)$$

A dependency of $p_{Mx,0}$, $v_{My}$, $v_{My}$ and $a^{(k)}$ is indicated here. The ground range positions $Y'_M{}^{(k)}$ are analytically obtained by means of Equation (18) as follows:

$$Y'^{(k)}_{M,a} = \sqrt{\left[(v_{Ax} - v_{Mx}) t^{(k)}_M - p_{Mx,0}\right]^2 + \left[v_{My} t^{(k)}_M + p_{My,0}\right]^2} + \Delta y^{(k)}_T, \quad (24)$$

that is, they are dependent on $p_{Mx,0}$, $p_{My,0}$, $v_{Mx}$, and $v_{My}$. Finally, advantageously, an analytical value for the signal amplitude in image k can be indicated while neglecting disturbances, such as direction-dependent reflections as follows $$|u^{(k)}_a| = |u_{max}| \cdot si^2 \left( \pi \frac{l}{\lambda} \cdot \sin\theta_k \right) \quad (25)$$

wherein $u_{max}$ is the maximum amplitude of the respective object, and saturation effects are not considered. In the event of aliasing, the time shift according to Equation (7) is also falsified as follows $$\Delta t^{(k)}_M = -\frac{(f_D + a^{(k)} \cdot f_p) \lambda R_{M,0}}{2 v_{Ax}^2} \quad (26)$$

so that the amplitudes in the SL images according to Equation (25) then also appear to be correspondingly displaced with respect to time.

For the joint estimate, the quadratic error between the measured and the analytically derived positions is computed according to Equations (23) and (24) and is inserted into the above-mentioned cost function, which is as follows:

$$\varsigma = \frac{1}{K_M} \sum_{k_0}^{k_0 + K_M - 1} \left( X'^{(k)}_M - \hat{X}'^{(k)}_M \right)^2 + \left( Y'^{(k)}_M - \hat{Y}'^{(k)}_M \right)^2 \quad (27)$$

In an advantageous embodiment of the invention, in the cost function according to Equation (27), the measured amplitudes and the amplitudes analytically derived according to Equation (25) are also taken into account. The expanded cost function is therefore as follows:

$$\varsigma = \frac{1}{K_M} \sum_{k_0}^{k_0 + K_M - 1} \left( X'^{(k)}_M - \hat{X}'^{(k)}_M \right)^2 + \left( Y'^{(k)}_M - \hat{Y}'^{(k)}_M \right)^2 + \lambda_A \cdot \left( \frac{u^{(k)}}{\bar{u}} - \frac{\hat{u}^{(k)}}{\hat{\bar{u}}} \right)^2 \quad (28)$$

Since, in Equations (27) and (28), in the analytically computed values according to Equations (23) to (25) in each case the values of the parameters to be estimated are inserted, starting with the values from the preceding sections, the index a was in each case replaced by the ^. The measurements of the amplitudes $u^{(k)}$ and of the positions $(X'_M, Y'_M)^{(k)}$ are carried out in the SL images. For this purpose, the respective center of gravity relative to the intensity of an observed object is used. In order to achieve an independence of the backscatter coefficient (that is, of $u_{max}$), in the amplitude term, a division takes place in each case by the average amplitude $\bar{u}$ or $\hat{\bar{u}}$. The averaging takes place by way of all values $u^{(k)}$ and $\hat{u}^{(k)}$ respectively in which the candidate was detected. In addition, the quadratic error of the amplitude was weighted by means of a parameter $\lambda_A$ in order to establish the relation of the quadratic errors.

In an embodiment of the method according to the invention, the established cost function for obtaining the improved estimated values for the five parameters, $\hat{p}_{Mx,0}$, $\hat{p}_{My,0}$, $\hat{v}_{Mx}$, $\hat{v}_{My}$ and a, is minimized, for example, by means of the Down-Simplex optimization method such as is discussed in J. A. Nelder and R. Mead, A Simplex Method for Function Minimization, Computer Journal, No. 7, pp. 308–317, July 1964. As mentioned above, starting values for the optimization are the previously obtained estimated values from the preceding sections. The Downhill-Simplex optimization method will continue to change one of the parameters as long as the costs according to the defined cost functions diminish, or deteriorate in a maximum number of iterations $N_{Opt, \ldots worse}$. Then the next parameter will be changed, etc. During the search, the increment is reduced. The process ceases after a defined number of iterations or when no parameter change after more than $N_{Opt,worse}$ steps results in a reduction of costs. The Downhill-Simplex optimization method is convergent and can overcome local minimums.

In an advantageous embodiment of the invention, an estimated value $\hat{v}_{Mx}$ for the azimuth component of the velocity vector of the candidate is determined from the azimuth components of the displacement vectors $D_x^{(k)}$ of the candidate. This estimated value will then be kept constant during the optimization method for estimating the other parameters.

In another advantageous embodiment of the invention, an estimated value for the range component $\hat{p}_{My,0}$ of the position vector of the candidate is determined from the individual range positions $Y'_M{}^{(k)}$ of the candidate in the individual single-look SAR images; this estimated value is kept constant during application of the optimization method for estimating the other parameters.

Verification of the Candidates as Moving Objects

As explained in the section "Measuring of the Displacement Vectors" the candidates are tracked from one image to the next corresponding to the displacement vectors estimated for preceding pairs of images. The selected candidates are verified as moving objects if the tracking of a candidate from SL image $k_0$ to SL image $k_0+1$ and further to SL image $k_0+K_M-1$ by means of the displacement vectors can be achieved by way of, for example, at least $K_{M,min}=4$ SL images of the sequence. In this case, it is permissible to interrupt the tracking in one or two successive SL images. In addition, it is required that one of the two values of the velocity components reaches the following minimum:

Azimuth component $|\hat{v}_{Mx}|$: 5 km/h or range component $|\hat{v}_{My}|$: 20 km/h.

Compensation of Image Defects

The compensation of the image defects with the goal of the correct display of the moving objects can take place in two ways: either a compensated SAR image sequence or a compensated multi-look image is generated. The background is maintained in both cases.

In the first case of the compensated SAR image sequence, the following steps are implemented in the individual SL images:

Extraction of the moving objects with the initial shapes $S_{M,0}{}^{(k)}$ from the original SL images;

computing of the positions $(X_M, Y_M)^{(k)}$ in the individual SL images using the estimated values for the position and the velocity and the times of the images according to Equation (2);

insertion of the moving objects in the computed positions $(X_M, Y_M)^{(k)}$ with the shape $S_M$. The time shift according to Equation (26) is compensated in that the objects are extracted from correspondingly different images than those in which they are inserted again.

Figure 10A:
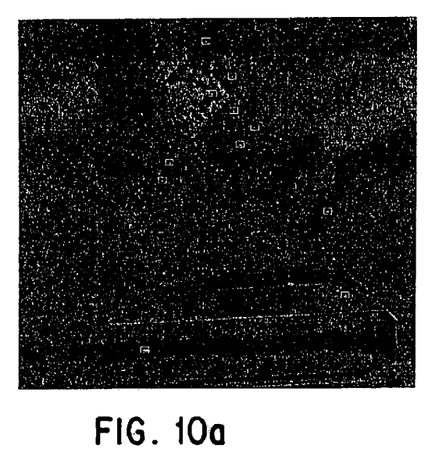
FIG. 10a) is single-look SAR image No. 17 from a generated SAR image sequence consisting of 30 images, with the look center frequency being 75 Hz and the moving objects appearing distorted (mainly the bottom object) and away from the road or in some cases, having completely disappeared.
Figure 10B:
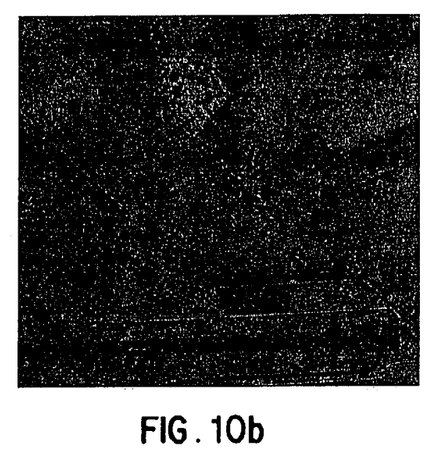
FIG. 10b) is a compensated single-look SAR image from the compensated SAR image sequence; the estimated moving direction of the detected moving objects being marked by an arrow.

FIG. 10b shows an example of the result. In comparison to the original image in FIG. 10a, all image defects are largely compensated.

In the second case (generation of the compensated multi-look image), the following steps are implemented in the individual SL images:

Extraction of the moving objects with the initial shapes $S_{M,0}{}^{(k)}$, from the original SL images;

insertion of the moving objects in the estimated reference position $\hat{p}_{M,0}$ with the shape $S_M$. Here also, the time shift, according to Equation (26), is compensated by extracting and inserting, under certain circumstances, different images.

multi-look averaging, that is, averaging of the amplitude values from different SL images.

Figure 11A:
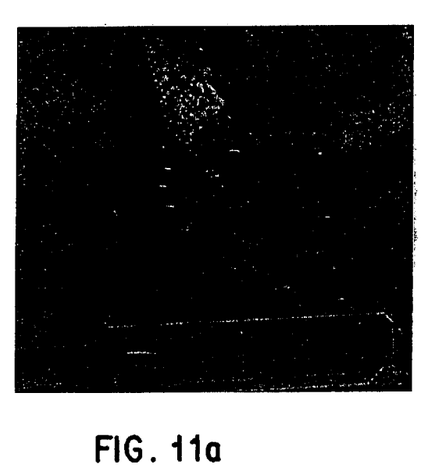
FIG. 11a) is a multi-look image of a conventional SAR processor, the moving objects appearing distorted and displaced in the azimuth direction, some having even disappeared.
Figure 11B:
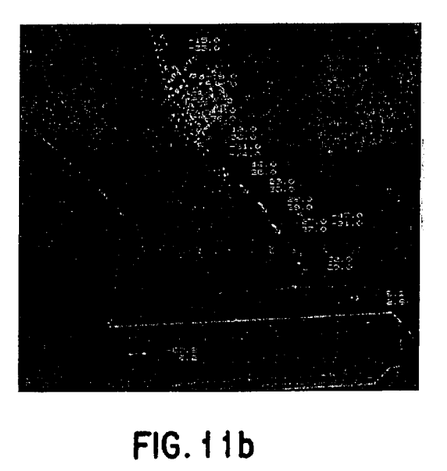
FIG. 11b) is a compensated multi-look image, with the moving objects appearing undistorted at the estimated reference positions, and the movement direction and the estimated velocity components being indicated in each case.

FIG. 11b shows an example of the result. Compared to the latter, FIG. 11a shows a multi-look image of a conventional SAR processor. The image defects of the moving objects are clearly demonstrated, which are largely compensated in FIG. 11b.

Results

The method according to the invention was applied to simulated and true SAR raw data. The simulated data were simulated SAR raw data of moving objects, which were superimposed by means of real background data (clutter data). The real SAR raw data of moving vehicles as well as the background data used for the superimposition originate from the DOSAR system of the firm Dornier GmbH in the C-band (5.3 GHz) or the X-band (9.6 GHz). The signal/clutter ratio in the SL image amounted to approximately between 3 and 8 dB. The antenna velocity amounted to approximately 300 km/h or 83 m/s, and a sequence of 30 images was generated and used. The Doppler bandwidth utilized in this case amounted to 1,500 Hz, which corresponds to approximately 2.5 times the clutter bandwidth.

Figure 7:
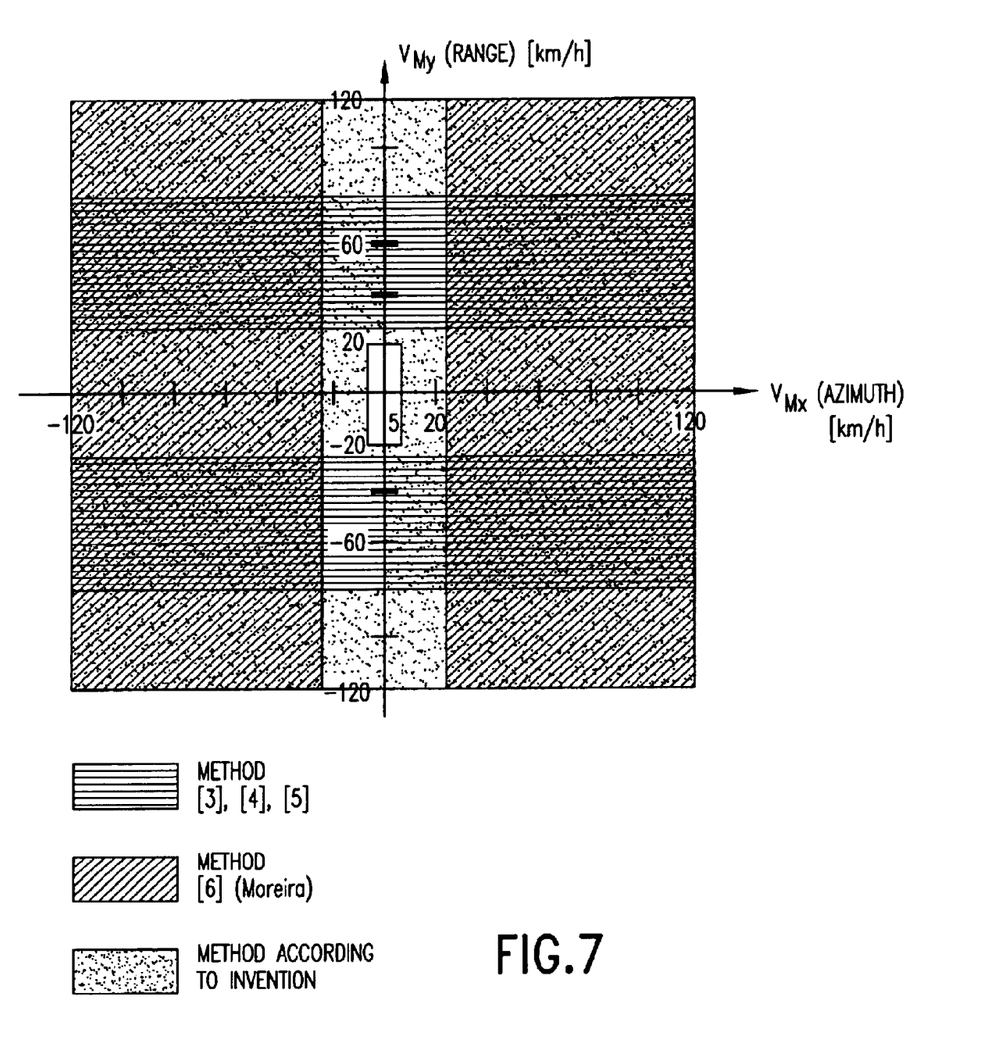
FIG. 7 is a comparison of the detection and measuring ranges of the object velocity for various methods (relative to DOSAR (Dornier SAR) parameters, single channel, C-band)
Figure 8:
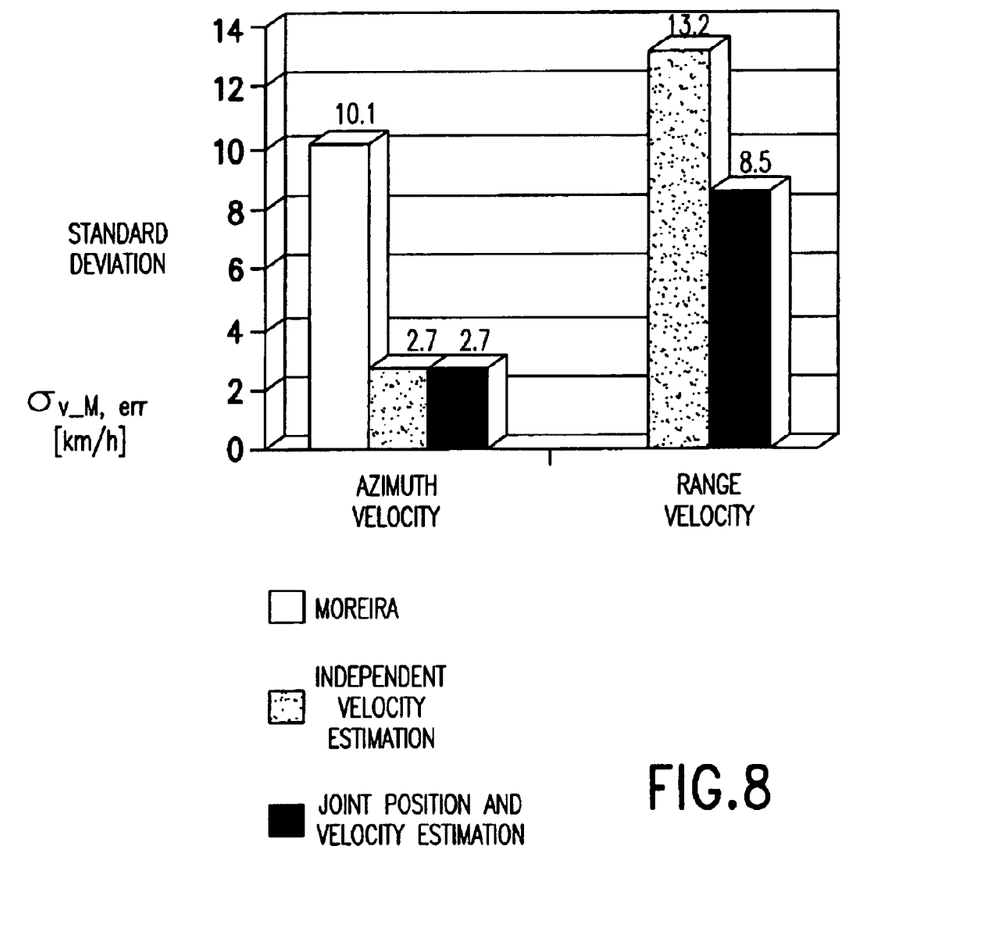
FIG. 8 shows estimation results for the azimuth and range velocity, in form of the standard deviation of the estimation error for various methods.

In the case of objects with azimuth velocities of between +/−5 km/h (+/−1.4 m/s) and +/−120 km/h (+/−33.3 m/s), the azimuth velocity $v_{Mx}$ could be estimated with a standard deviation of the estimation error of 2.7 km/h. For the range velocity, the corresponding value was 8.5 km/h for the range between +/−20 km/h (+/−5.6 m/s) and +/−120 km/h (+/−33.3 m/s). (See FIG. 8.) In comparison to the other known methods, the measuring range for both velocity components was expanded (FIG. 7), in which case some ranges (for low velocities as well as the range $|v_{Mx}|<22$ km/h and 80 km/h$<|v_{My}|<120$ km/h) are covered for the first time by a method for single-channel SAR data. In this case, the upper value of the measuring range for the range velocity was determined for the PRF of 1,500 Hz available in the DOSAR system at a carrier frequency in the C-band (5.3 GHz).

The following is obtained for the detection rate: In the range between +/−10 km/h (+/−2.8 m/s) and +/−80 km/h (+/−22.2 m/s), 96% of all moving objects are detected; at a higher or lower velocity, at least 80%. The false-alarm rate amounted to approximately 2%. In this case, the detection rate and the false-alarm rate can easily be controlled by way of the minimum number $K_{M,min}$ of the images in which a candidate must be detected, as well as by way of the velocity threshold values. In the case of the indicated results, the minimum number was $K_{M,min}=4$ images.

Figure 9:
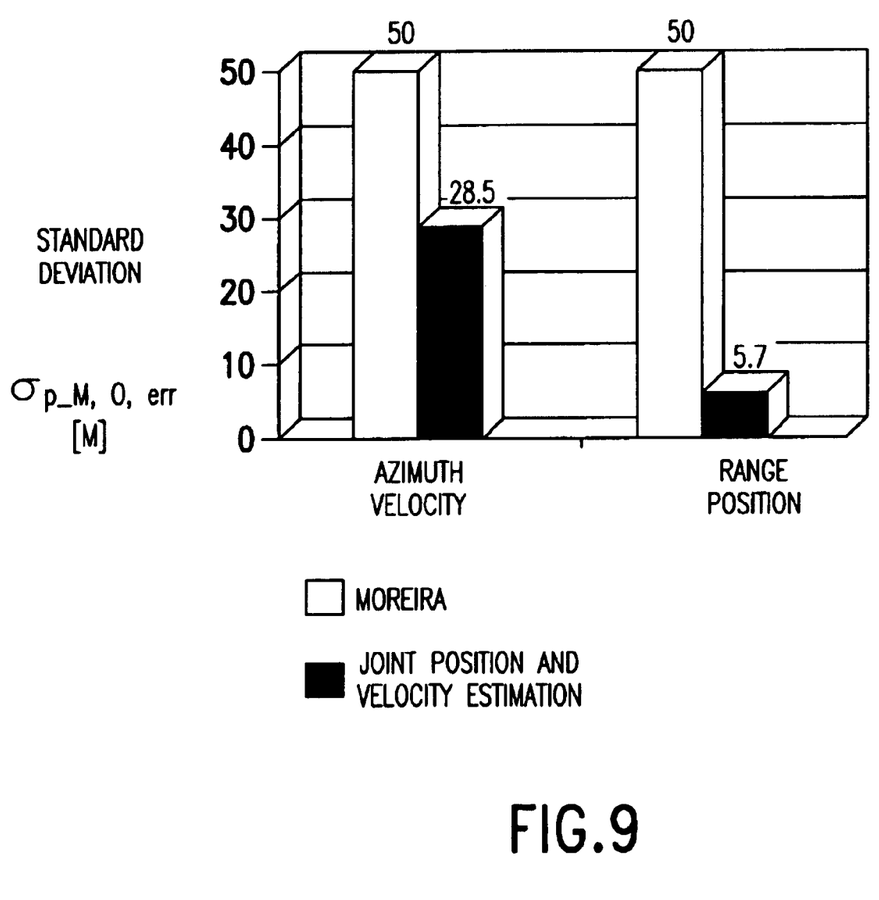
FIG. 9 shows estimation results for the azimuth and range position, in the form of the standard deviation of the estimation error.

During the position estimation, the following results were obtained (FIG. 9): The standard deviation of the estimation error amounts to 28.5 m in the azimuth and 5.7 m in the range direction. In comparison, in J. R. Moreira and W. Keydel, "A new MTI-SAR approach using the reflectivity displacement method." IEEE Trans. Geoscience and Remote Sensing, Vol. 33, No. 5, pp. 1238–1244, September 1995, approximately 50 m are indicated for both components. On the whole, a significant improvement in comparison to known methods is therefore achieved for the estimated velocity as well as for the position.

This is also reflected in the achieved image results. As an example, FIG. 10 shows an SL image from a SAR image sequence, (detected moving objects being marked by a white square in FIG. 10a) in comparison to a compensated SL image (b). While, in the original image, the moving objects appear distorted and away from the road or, in some cases, have disappeared completely, these image defects are largely compensated in FIG. 10b. A similar situation is found in the case of multi-look images. FIG. 11a) shows a multi-look image of a conventional SAR processor in which the distortions of the moving objects are particularly clearly visible. In comparison, FIG. 11b) shows a compensated multi-look image in which the objects are again imaged largely undistorted on the road.

The foregoing disclosure has been set forth merely to illustrate the invention and is not intended to be limiting.

Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting moving objects and estimating their velocity and position in SAR images, comprising:

generating a sequence of single-look SAR images which are of the same polarization, are successive with respect to time, and have a look center frequency which varies from one image to the next;

detecting candidates for moving objects in said single-look SAR images by searching for regions with a course of intensity which deviates from a surrounding environment:

estimating velocity of detected candidates by estimation of at least one displacement vector of one candidate respectively, utilizing a correlation between successive single-look SAR images; and verifying detected candidates as moving objects; wherein estimation of at least one velocity component of a detected candidate takes place jointly with an estimation of at least one position component of the candidate;

a cost function is established as a function of the components to be estimated, taking into account positions of the candidate in the individual single-look SAR images of the sequence;

the cost function is minimized by means of an optimization method for the parameter or parameters to be estimated; and the cost function also takes into account time-dependent amplitudes of the candidates in the individual single-look SAR images of the sequence.

2. The method according to claim 1, wherein the cost function is minimized taking into account another parameter to be estimated for compensation of aliasing in the Doppler spectrum.

3. The method according to claim 1, wherein:

an estimated value for an azimuth component of a velocity vector of a respective candidate is determined from azimuth components of the displacement vectors of the candidate; and the estimated value for the azimuth component is kept constant in the optimization method for the joint position and velocity estimation of the other parameters to be estimated.

4. The method according to claim 1, wherein:

an estimated value for a range component of a position vector of a respective candidate is determined from individual range positions of a candidate in individual single-look SAR images; and the estimated value for the range component is kept constant in the optimization method for the joint position and velocity estimation of other parameters to be estimated.

5. The method according to claim 1, wherein during the detecting of the candidates, corresponding regions in respective single-look SAR images are assigned to each detected candidate as individual initial shapes.

6. The method according to claim 1, wherein corresponding to estimated velocity of a candidate, the shape of a candidate is estimated by equalizing respective initial shapes.

7. The method according to claim 5, wherein image defects of the moving objects within a sequence of the single-look SAR images are compensated by extracting the moving objects with the corresponding initial shapes from the single-look SAR images, and are inserted again in the estimated or computed positions by means of the initial shapes or the estimated shapes into the single-look SAR images.

* * * * *